United States Patent
Sato et al.

(10) Patent No.: US 10,242,491 B2
(45) Date of Patent: Mar. 26, 2019

(54) IMAGE PROCESSING APPARATUS FOR DETERMINING IMAGE CLIP POSITION, METHOD THEREOF, AND STORAGE MEDIUM

(71) Applicant: CANON KABUSHIKI KAISHA, Tokyo (JP)

(72) Inventors: Masanori Sato, Yokohama (JP); Masashi Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 15/648,294

(22) Filed: Jul. 12, 2017

(65) Prior Publication Data

US 2018/0025533 A1 Jan. 25, 2018

(30) Foreign Application Priority Data

Jul. 22, 2016 (JP) .................................. 2016-144513
Jan. 24, 2017 (JP) .................................. 2017-010748

(51) Int. Cl.
*G06T 15/30* (2011.01)
*G06T 19/00* (2011.01)
*H04N 13/204* (2018.01)
*H04N 13/327* (2018.01)
*H04N 13/344* (2018.01)

(52) U.S. Cl.
CPC ............ *G06T 15/30* (2013.01); *G06T 19/006* (2013.01); *H04N 13/327* (2018.05); *H04N 13/344* (2018.05); *H04N 13/204* (2018.05)

(58) Field of Classification Search
CPC ...... G06T 15/30; G06T 19/006; H04N 13/327; H04N 13/344; H04N 13/204
See application file for complete search history.

(56) References Cited

U.S. PATENT DOCUMENTS

2014/0320526 A1* 10/2014 Yamakawa ........... G06T 19/006 345/620
2016/0131912 A1* 5/2016 Border ............... G02B 27/0176 345/8

FOREIGN PATENT DOCUMENTS

JP 3984907 B2 10/2007

* cited by examiner

*Primary Examiner* — Kee M Tung
*Assistant Examiner* — Grace Q Li
(74) *Attorney, Agent, or Firm* — Canon U.S.A., Inc. IP Division

(57) ABSTRACT

An image processing apparatus includes an image acquisition unit acquiring a first and second captured images from first and second points of view respectively, an initial value acquisition unit acquiring initial values of respective clip positions to clip display images from the first and second captured images, a derivation unit deriving an amount of a first exterior region of a first display image outside a first region of the first captured image when the first display image is clipped based on the initial values, and deriving an amount of a second exterior region of a second display image outside a second region of the second captured image when the second display image is clipped based on the initial values, and a determination unit determining the respective clip positions to clip the display images from the first and second captured images based on the first and second amounts.

16 Claims, 13 Drawing Sheets

IMAGE PROCESSING APPARATUS FOR DETERMINING IMAGE CLIP POSITION, METHOD THEREOF, AND STORAGE MEDIUM

BACKGROUND OF THE INVENTION

Field of the Invention

The present invention relates to technology for determining a position to clip an image and, more particularly, technology for determining a clip position to clip, from an image captured by an image capturing device, an image to be displayed on a display.

Description of the Related Art

As the technology for mixing a real world and a virtual world in real time, mixed reality (MR) technology and augmented reality (AR) technology are known. The technology is to smoothly mix a real space and a virtual space created by a computer. It is expected that the technology is applied to various fields such as supporting to assemble as superimposing an operation procedure or a wiring manner during an assembling operation in a factory or the like or supporting an operation as superimposing a manner inside a body on a surface of the body of a patient in a hospital or the like, for example.

To make a viewer feel like the virtual object exists in the real space, the geometric consistency between the virtual object and the real space is important. An issue to deal with the consistency to correspond a coordinate system of the real space and a coordinate system of the virtual space is also referred to as a positioning issue in a mixed reality and various studies have been reported. The positioning issue is an issue to obtain positions and orientations of an image capturing device for capturing an image of the viewer's point of view and a real object to which virtual information is to be superimposed.

Further, as a device to make the viewer to feel like a virtual object exits in the real space, there is a video see-through image display device. This is a device in which a camcorder captures an image of the real world and a combined image in which a virtual object is superimposed on the captured image displayed on a display or the like in real time to show the viewer. As such a device, in general, a potable information terminal called a tablet terminal, which has a camcorder in its rear side, and a video see-through head-mounted display (HMD), which is put on user's head, are used.

In the MR technology (hereinafter, the mixed reality technology and the augmented reality technology are collectively referred to as MR technology), it is needed to maintain the geometric consistency to improve a sense of unity between the real world and the virtual world. The geometric consistency here represents a correspondence between the size, position, and perspective of a world or an object that the viewer recognizes when seeing the reality and the size, position, and perspective of a world or an object that the viewer recognizes through the MR technology. Here, a straight line drawn from a center of a camcorder lens to an image plane is referred to as an optical axis, and an intersection between the optical axis and the image plane is referred to as an image center or a principal point.

Japanese Patent No. 3984907 discloses a configuration of a video see-through HMD which is designed so that the optical axis of a camcorder corresponds to an axis that passes through a center of an eye of a tester and a center of the display. When it is designed so that the optical axes of the camcorder and the display correspond to each other, the geometric consistency may be maintained in theory.

According to the configuration disclosed in Japanese Patent No. 3984907, the geometric consistency can be maintained in theory as described above. However, due to an error caused during an assembly in a process of manufacturing the HMD, there may be a case that misalignment of the optical axes of the camcorder and display is caused and, in such a case, the geometric consistency cannot be maintained. Applicant has determined, regarding the case, that the consistency can be maintained by further processing that includes adjusting a region to clip, from a captured image, an image is to be displayed on a display, but that in a case that misalignment of the optical axes of the camcorder and display is large and the clip position is shifted from the center of the image to a large degree, an effective angle of view of a video displayed on a display may reduce since a part of the region to be clipped is outside the image capture region.

SUMMARY OF THE INVENTION

According to an aspect of the present invention, an image processing apparatus includes an image acquisition unit configured to acquire a first captured image captured from a first point of view and a second captured image captured from a second point of view which is different from the first point of view, an initial value acquisition unit configured to acquire initial values of respective clip positions to clip display images from the first captured image and the second captured image, a derivation unit configured to derive a first out-of-area amount that indicates an amount of a first exterior region of a first display image outside a first region of the first captured image when the first display image is clipped from the first captured image based on the initial values, and to derive a second out-of-area amount that indicates an amount of a second exterior region of a second display image outside a second region of the second captured image when the second display image is clipped from the second captured image based on the initial values, and a determination unit configured to determine the respective clip positions to clip the display images from the first captured image and the second captured image based on the first and second out-of-area amounts.

Further features of the present invention will become apparent from the following description of example embodiments (with reference to the attached drawings).

DESCRIPTION OF THE EMBODIMENTS

In the following, various example embodiments of the present invention will be described with reference to the attached drawings.

A first embodiment describes an embodiment to determine a clipping position to clip, from a region of a captured image, of a display image to be displayed on a head-mounted display (HMD) as a clipping position so that the sum of out-of-area amounts of regions of display images outside the regions of the captured images in right and left images becomes minimum.

Figure 1:
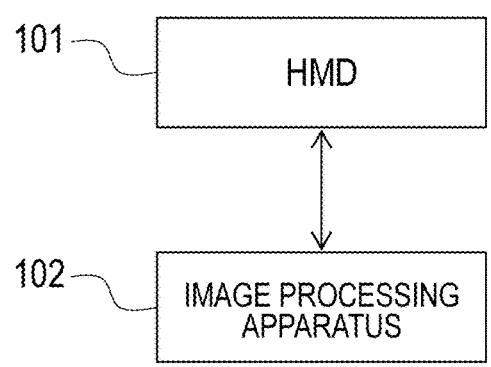
FIG. 1 is a configuration diagram of a system that includes an image processing apparatus according to a first embodiment.

FIG. 1 is a configuration diagram of a system including an image processing apparatus 102 according to the present embodiment and an HMD 101 connected to the image processing apparatus wired or wirelessly. The HMD 101 is put on use's head to view a combined image in which a virtual object is combined to an image of reality, and the combined image is generated by the image processing apparatus 102.

Figure 2:
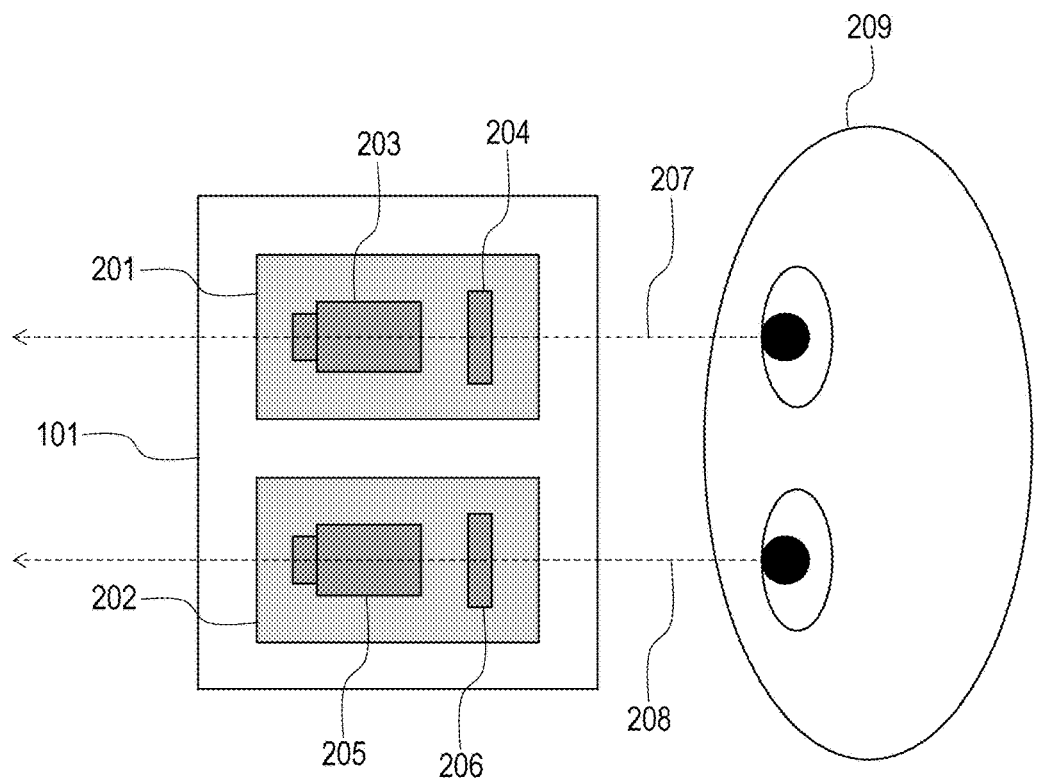
FIG. 2 is a configuration diagram of an HMD according to the first embodiment.

FIG. 2 is a diagram illustrating a viewer who views the HMD 101 as seen from the above and illustrates positions of camcorders and displays inside a housing of the HMD 101. As illustrated in FIG. 2, the HMD 101 includes a pair of a camcorder and a display corresponding to each of a right eye and a left eye and, in the following, an optical system inside the camcorder is referred to as an imaging optical system and an optical system inside the display is referred to as a display optical system. These optical systems include a right eye optical system 201 and a left eye optical system 202. Further, the right eye optical system 201 and left eye optical system 202 are respectively composed of a right eye imaging optical system 203 and a right eye display optical system 204, and a left eye imaging optical system 205 and a left eye display optical system 206. Optical axes 207 and 208 are a right eye optical axis and a left eye optical axis respectively. The optical axis 207 corresponds to optical axes of the right eye imaging optical system 203 and right eye display optical system 204 and also corresponds to a line of sight of the right eye of the viewer 209. Further, the optical axis 208 corresponds to optical axes of the left eye imaging optical system 205 and left eye display optical system 206 and also corresponds to a line of sight of the left eye of the viewer 209. In the following, the correspondence of the optical axes of the right and left eyes and the lines of sights is referred to as an optical axis correspondence.

Figure 3:
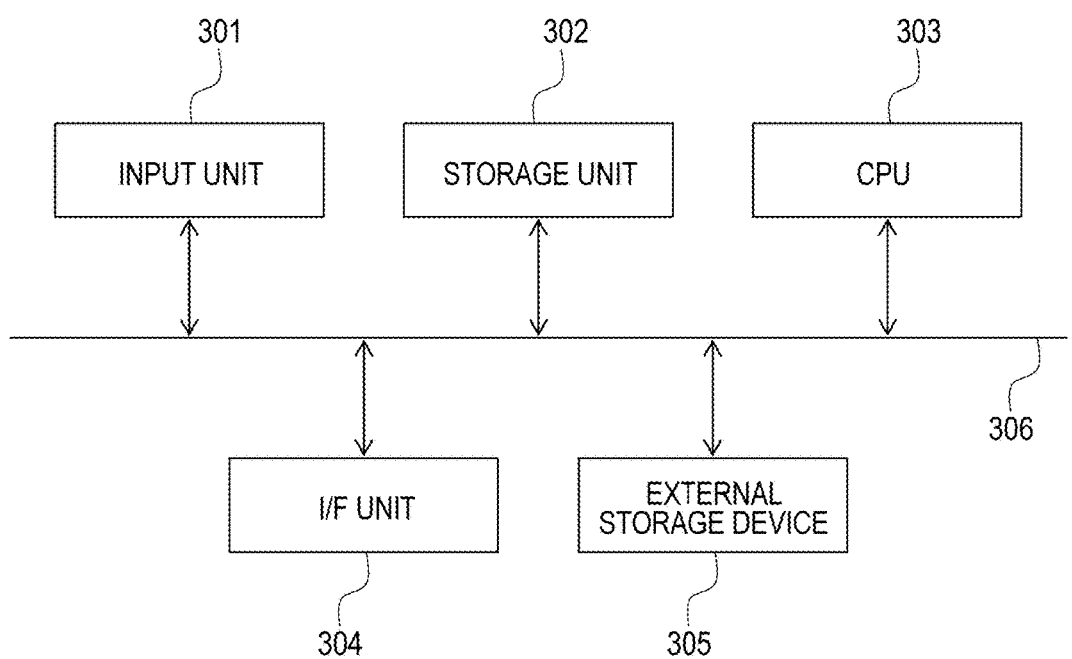
FIG. 3 is a hardware configuration diagram of the image processing apparatus according to the first embodiment.

Next, with reference to FIG. 3, a hardware configuration of the image processing apparatus 102 according to the present embodiment will be described. An input unit 301 is a keyboard, a mouse, or the like for example. A storage unit 302 is a random access memory (RAM) or a read only memory (ROM) and stores a program to realize a method described in the present embodiment, processing target data, and the like. A CPU 303 performs a process, which is described in this specification, according to the program stored in the storage unit 302 on the data stored in the storage unit 302. An I/F unit 304 is an interface for controlling data input and output to and from the HMD 101. An external storage device (or a secondary storage device) 305 is a hard disk or a flash memory. A data bus 306 is a bus to transmit and receive data.

Figure 4:
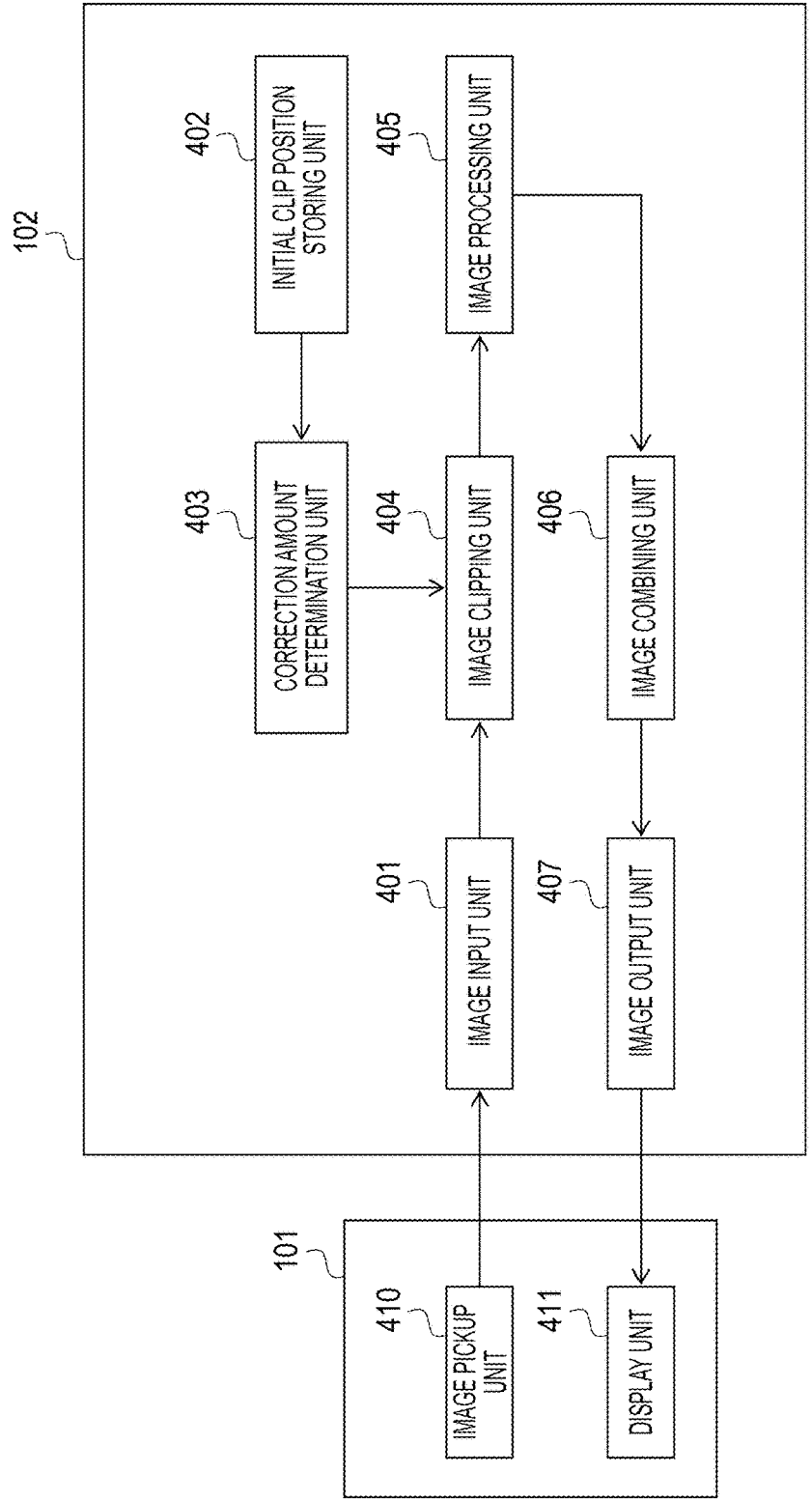
FIG. 4 is a functional block diagram of an image processing apparatus according to the first embodiment.

FIG. 4 is a block diagram illustrating functional configurations of the image processing apparatus 102 according to the present embodiment and the HMD 101, which is wired or wirelessly connected to the image processing apparatus 102. As illustrated in this drawing, the image processing apparatus 102 includes an image input unit 401, an initial clip position storing unit 402, a correction amount determination unit 403, an image clipping unit 404, an image processing unit 405, an image combining unit 406, and an image output unit 407.

Firstly, the functional configuration of the HMD 101 will be described.

An image pickup unit 410 is a stereo camera that captures images of a real space, generates captured images, and sequentially outputs images of each frame which composes a captured moving image to the image processing apparatus 102. The present embodiment describes a stereo camera installed in the HMD 101; however, the stereo camera may be a stereo camera installed in a mobile terminal device such as a smartphone, a tablet terminal device, and the like, and the embodiment is not limited to a particular installation manner. Then, the captured image is output to the image processing apparatus 102.

A display unit 411 receives an image from the image processing apparatus 102 and displays the image. The display unit 411 is composed of a CRT, an organic EL, a liquid crystal, or the like and displays the image output from the image processing apparatus 102. The HMD 101 according to the present embodiment has a display and the display serves as the display unit 411.

Next, the functional configuration of the image processing apparatus 102 will be described.

The image input unit 401 inputs an image captured by the stereo camera in the HMD 101. Here, an angle of view of the captured image input by the image input unit 401 is wider than a display angle of view of the display in the HMD 101.

Figure 5:
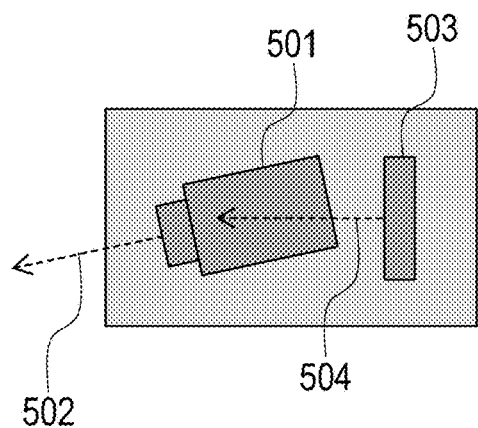
FIG. 5 is a diagram illustrating a misalignment of optical axes of an imaging optical system and a display optical system according to the first embodiment.

The initial clip position storing unit 402 stores an initial value of a clip position to clip a display image from a captured image. Here, the clip position stored in the initial clip position storing unit 402 is assumed to be a position where an apparent optical axes correspondence of the captured image and display image is maintained. This clip position adjustment is used to maintain a geometric consistency. Further, this adjustment is performed in a calibration phase in factory assembly, or in a calibration process (re-alignment of the right and left cameras) of an assembled HMD. Here, as illustrated in FIG. 5, when calibration is performed in a condition that the optical axis 502 of the imaging optical system 501 and the optical axis 504 of the display optical system 503 are considerably misaligned, a part of a clipping region may be outside the image capture region. This misalignment is caused depending on an assembling accuracy in manufacturing of the HMD 101. Here, details of the case that a part of the clipping region is out of the image capture region will be described with reference to FIGS. 7 and 9.

The correction amount determination unit 403 acquires an initial position from the initial clip position storing unit 402 (an initial value acquisition) and determines a correction amount for shifting the initial position based on an evaluation result of evaluating an amount of misalignment in the right and left side of the image.

The image clipping unit 404 clips a region, from an image input from the image input unit 401, of a predetermined region having a center of the position where the clip position is shifted based on the correction amount determined by the correction amount determination unit 403.

The image processing unit 405 performs image processing such as a color adjustment, a noise reduction, and the like as desired on the image of the region clipped by the image clipping unit 402.

The image combining unit 406 generates a combined image in which the image processed by the image processing unit 405 and a virtual image like a computer graphics (CG) are combined.

The image output unit 407 outputs the image processed in the image combining unit 406 to the display unit 411.

Figure 6:
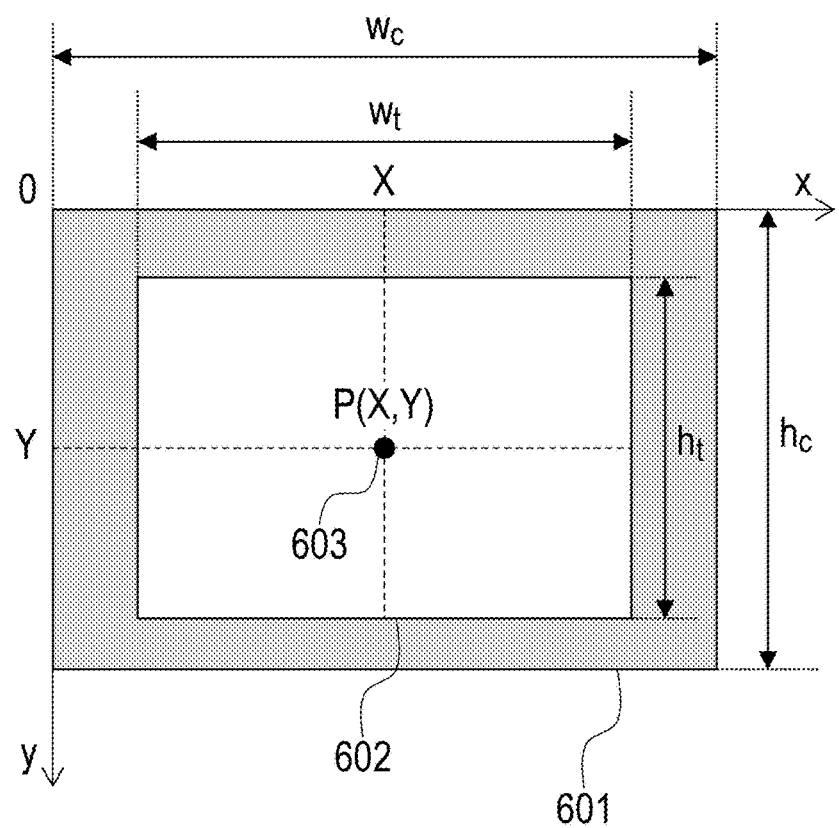
FIG. 6 is a diagram explaining image clipping in a case of a single eye according to the first embodiment.

FIG. 6 illustrates a diagram explaining an image clipping process assuming a case of a single eye.

An image capture region 601 is an image capture region captured by the imaging optical system. On the image capture region 601, an x-y coordinate system is defined, in which an upper left point is set as an origin and the right direction and the lower direction are positive. Here, a length in the horizontal direction and a length in the vertical direction of the image capture region 601 are represented as $w_c$ and $h^c$, respectively.

A clipping region 602 is a clipping region clipped by the image clipping unit 402. Here, a length in the horizontal direction and a length in the vertical direction of the clipping region 602 are represented as $w_t$ and $h_t$, respectively.

A center point 603 is a clipping center point at a center of the clipping region. 602. According to the present embodiment, by giving the clipping center point 603 to the image clipping unit 402, the clipping region 602 can be uniquely specified. Further, the coordinate P(X, Y) of the clipping center point is expressed in a coordinate system according to the image capture region 601. Here, to uniquely specify the clipping region 602, any other proper point such as a point of an upper left corner of the clipping region may be used, as a substitute for the clipping center point according to the present embodiment.

Figure 7:
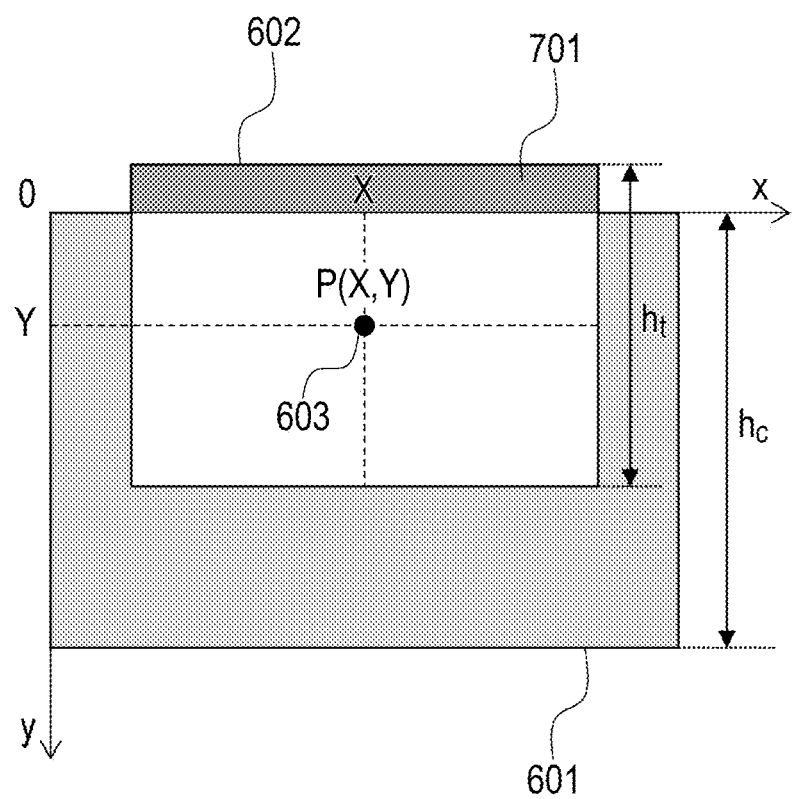
FIG. 7 is a diagram explaining an out-of-area region of a case of a single eye according to the first embodiment.

FIG. 7 illustrates a diagram explaining a case that a part of a clipping region is outside the image capture region, assuming a case of a single eye. In other words, when the optical axes of the camcorder and the display are considerably misaligned, a part of the clipping region may be out of the image capture region as illustrated in FIG. 7. In FIG. 7, there is an out-of-area region 701 above the image capture region 601. Here, it can be expressed as $Y < h_t/2$. Here, according to the present embodiment, only an out-of-area region in the vertical direction as illustrated in FIG. 7 is considered and an out-of-area region in the horizontal direction is not considered.

Figure 8:
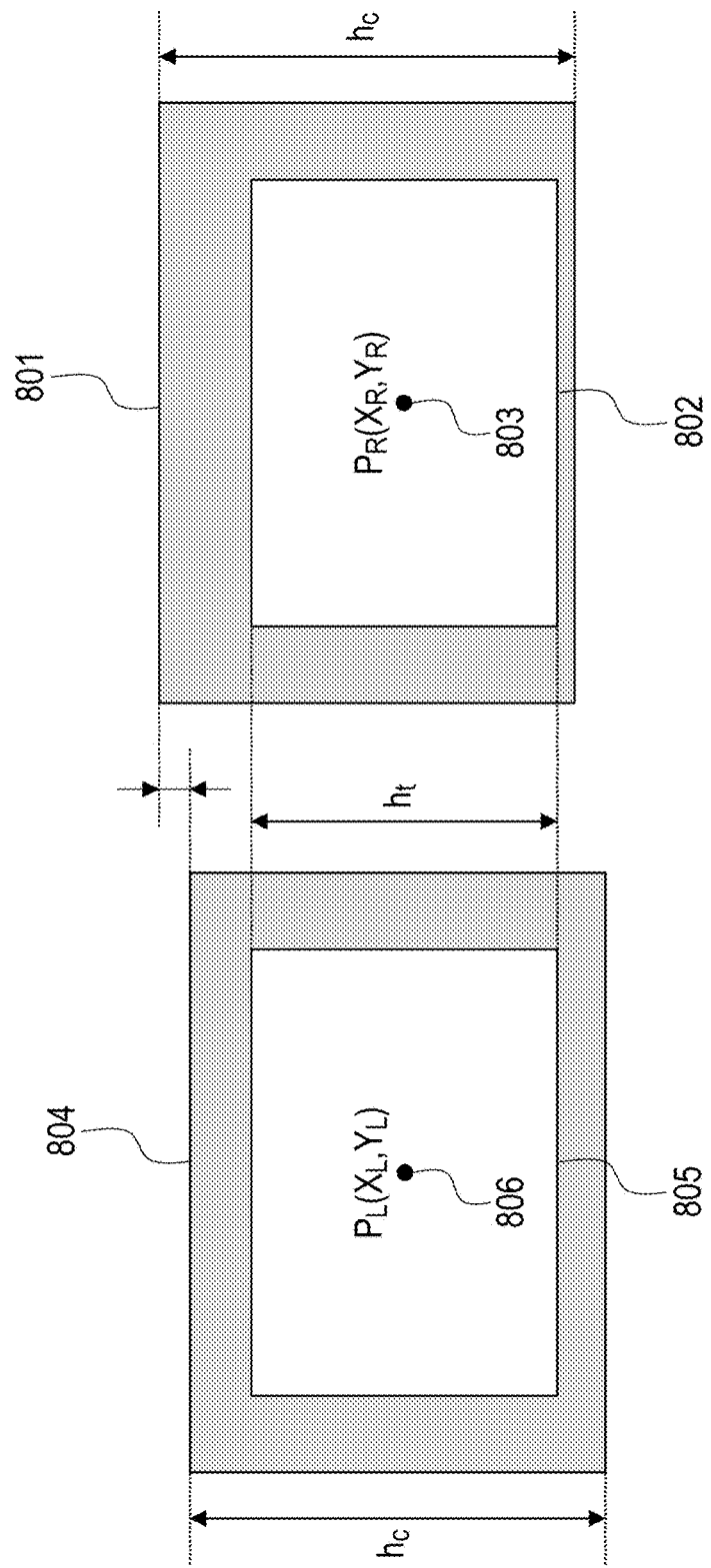
FIG. 8 is a diagram explaining image clipping in a case of right and left eyes according to the first embodiment.

FIG. 8 illustrates a diagram explaining image clipping in a case that a clipping process is performed on respective images captured by the right and left camcorders of the HMD 101. An image capture region 801 is an image capture region captured by the right eye imaging optical system 203. A right eye clipping region 802 is a region clipped by the image clipping unit 402. A right-eye clipping center point 803 represents a center of the right eye clipping region 802. Similarly, an image capture region 804, a clipping region 805, and a center point 806 are an image capture region captured by the left eye imaging optical system 205, a left-eye clipping region, and a left-eye clipping center point, respectively. Here, the lengths in the vertical direction of the image capture region 801 and image capture region 804 are equally $h_c$, and the lengths in the vertical direction of the clipping region 802 and clipping region 805 are equally $h_t$. A vertical positional relationship of the image capture region 801 and image capture region 804 has a slight displacement as already described with reference to FIG. 5, due to an assembling accuracy of the right and left optical systems in the manufacturing of the HMD 101. However, regarding the clipping region 802 and clipping region 805, clipping center points $P_R$803 and $P_L$806 are adjusted to align the regions in the vertical direction. Here, the coordinate of the right-eye clipping center point 803 is expressed as $(X_R, Y_R)$, and the coordinate of the left-eye clipping center point 806 is expressed as $(X_L, Y_L)$. This adjustment process is performed in a calibration process after assembly of the HMD 101. With this, the vertical misalignment amount of the image capture region 801 and image capture region 804 can be calculated as $|Y_R - Y_L|$.

Figure 10:
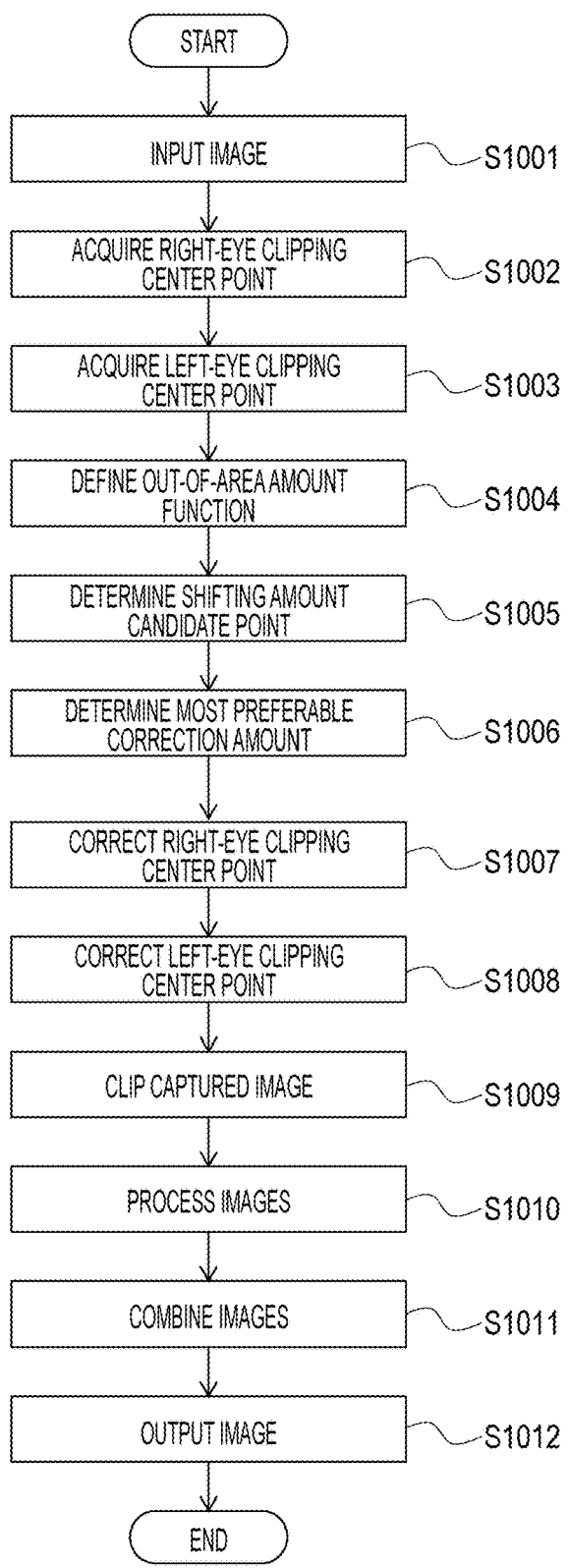
FIG. 10 is a flowchart illustrating a flow of a process by the image processing apparatus according to the first embodiment.

FIG. 10 is a flowchart illustrating a process procedure executed by the image processing apparatus 102 according to the present embodiment. In the following, a process flow will be explained with reference to FIG. 10.

Firstly, the image input unit 401 inputs a captured image transmitted from the HMD 101 (S1001).

Next, the correction amount determination unit 403 acquires a right-eye clipping center point from the initial clip position storing unit 402 (step S1002).

Next, the correction amount determination unit 403 acquires a left-eye clipping center point from the initial clip position storing unit 402 (step S1003). Here, the process in step S1003 may be executed before the process in step S1002.

Figure 9:
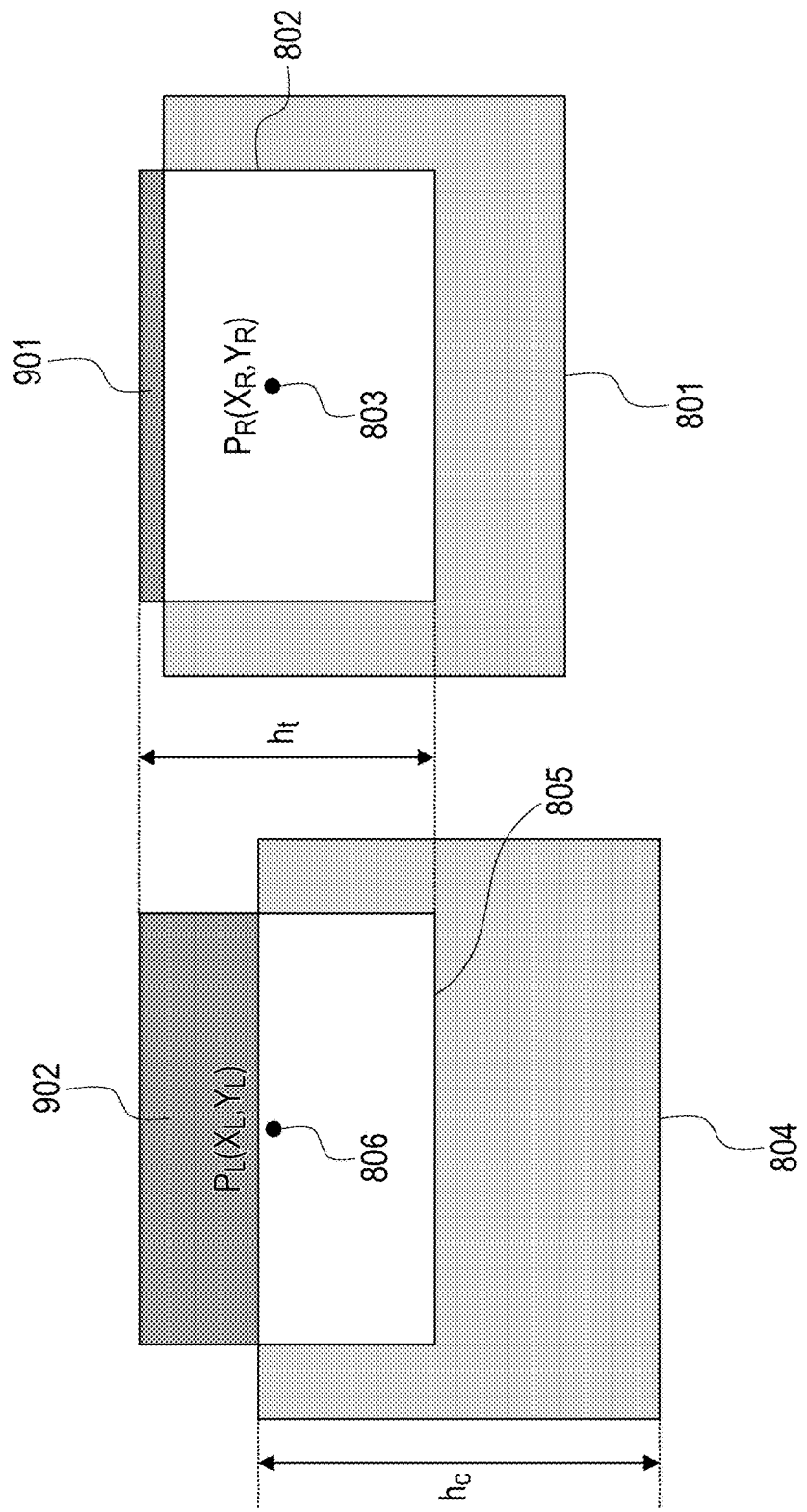
FIG. 9 is a diagram explaining out-of-area regions in a case of right and left eyes according to the first embodiment.

Next, the correction amount determination unit 403 defines an out-of-area amount function F(d) related to the clipping region (step S1004). FIG. 9 illustrates a diagram explaining a case that a part of the clipping regions is out of the image capture regions, assuming the right and left eyes. For example, compared to a condition illustrated in FIG. 8, when the optical axes of the right and left imaging optical systems are both shifted lower with respect to the display optical system optical axis, out-of-area regions 901 and 902 may occur as illustrated in FIG. 9.

Here, an independent variable d of the function is a correction amount (shifting amount) in the vertical direction with respect to the initial clipping center point stored in the initial clip position storing unit 402 and, when an absolute value of the independent variable d is smaller, a misalignment of geometric consistencies of the virtual object and the real space becomes smaller. According to the present embodiment, the out-of-area amount function F(d) is defined as follows, as a sum of an upper out-of-area amount $U_R(d)$ and a lower out-of-area amount $D_R(d)$ of the right-eye clipping region and an upper out-of-area amount $U_L(d)$ and a lower out-of-area amount $D_L(d)$ of the left-eye clipping region.

$F(d)=U_R(d)+D_R(d)+U_L(d)+D_L(d)$, and further the $U_R(d)$, $D_R(d)$, $U_L(d)$, and $D_L(d)$ are defined as follows respectively.

$$U_R(d) = \max\left((Y_R + d) - \frac{h_t}{2} - Y_R, 0\right)$$

$$D_R(d) = \max\left(\frac{h_t}{2} - (h_c - (Y_R + d)), 0\right)$$

$$U_L(d) = \max\left((Y_L + d) - \frac{h_t}{2}, 0\right)$$

$$D_L(d) = \max\left(\frac{h_t}{2} - (h_c - (Y_L + d)), 0\right)$$

Next, the correction amount determination unit 403 determines a candidate point of a correction amount d that causes the smallest out-of-area amount F(d) related to the clipping region (S1005). In the following, the detailed process in S1005 will be described.

Figure 11:
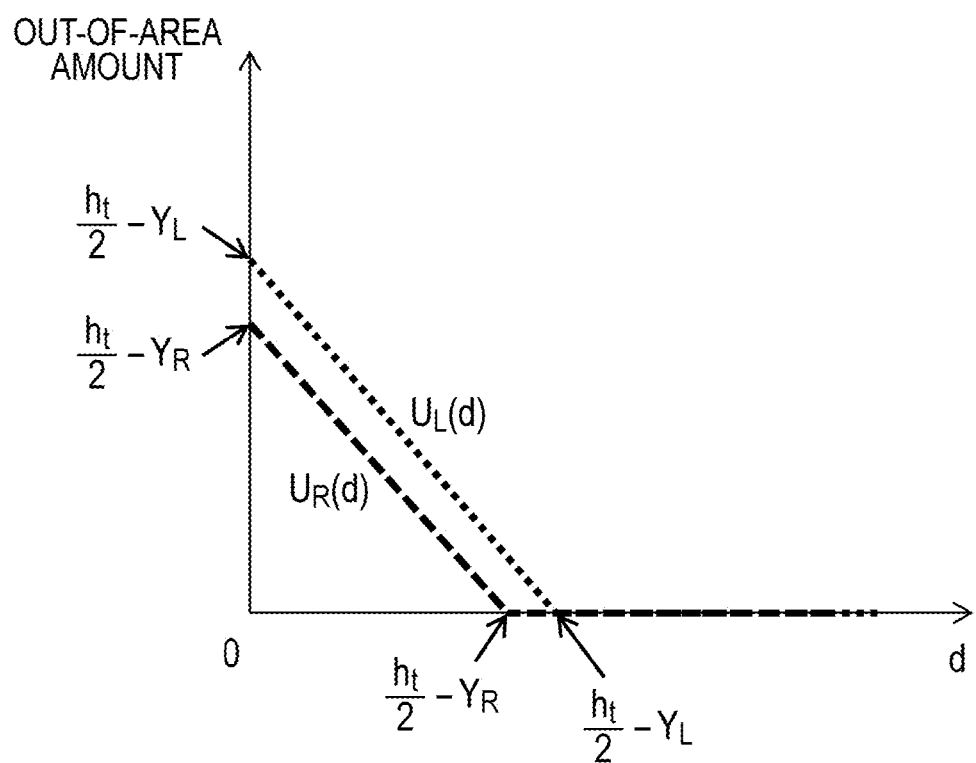
FIG. 11 is a graph of an upper out-of-area amount function according to the first embodiment.
Figure 12:
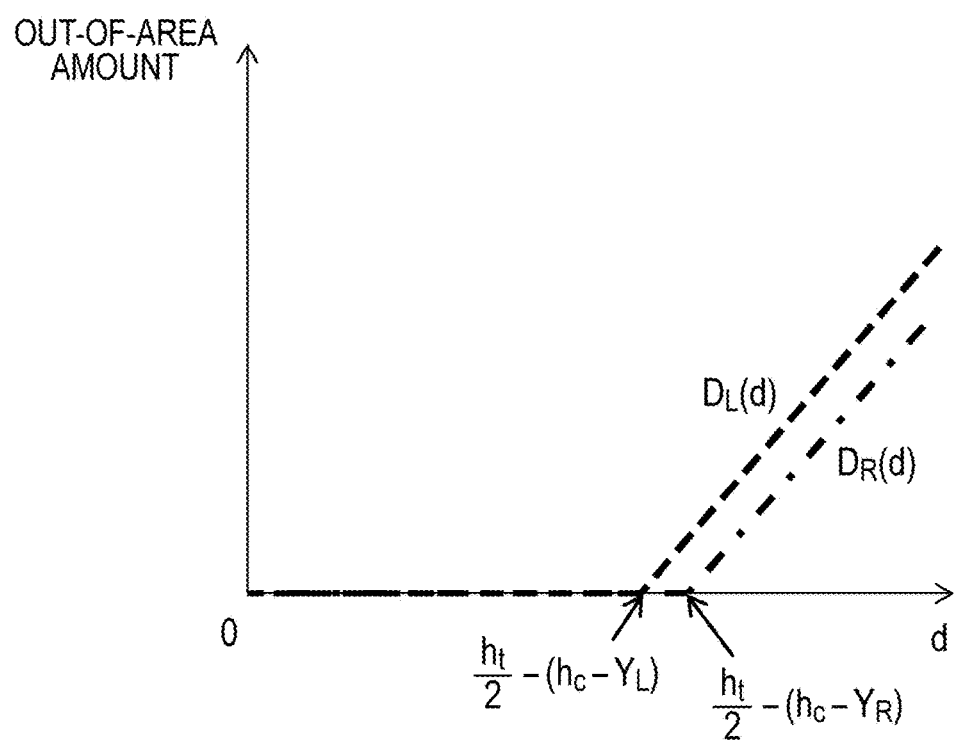
FIG. 12 is a graph of a lower out-of-area amount function according to the first embodiment.
Figure 13:
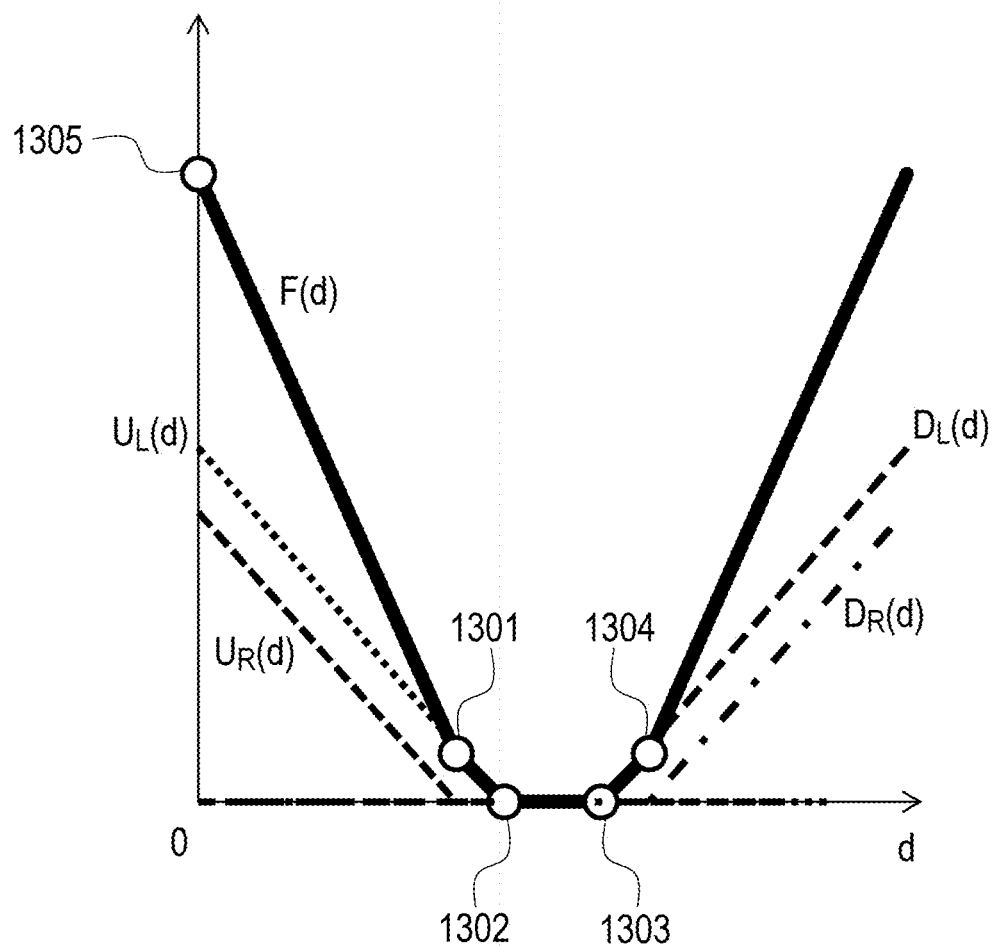
FIG. 13 is a graph of an out-of-area amount function according to the first embodiment.

FIG. 11 illustrates the $U_R(d)$ and $U_L(d)$ in a graph. As seen from FIG. 11, the $U_R(d)$ and $U_L(d)$ have inflection points where the inclinations of the graphs change in $d=H_t/2-Y_R$ and $d=H_t/2-Y_L$, respectively. Further, FIG. 12 illustrates the $D_R(d)$ and $D_L(d)$ in a graph. As seen from FIG. 12, the $D_R(d)$ and $D_L(d)$ have inflection points where the inclinations of the graphs change in $d=H_t/2-(hc-Y_R)$ and $d=H_t/2-(hc-Y_L)$ respectively. Thus, F(d), which is expressed by the sum of these values, has inflection points where the inclination of the graph changes in $d=H_t/2-Y_R$ (point 1301), $d=H_t/2-Y_L$ (point 1302), $d=Y_R-H_t/2$ (1303), and $d=Y_L-H_t/2$ (1304), as illustrated in FIG. 13. Then, F(d) takes a minimum value from any of the points 1301 to 1304 and an intercept 1305 of the F(d). A point 1301 represents a condition that the upper sides of the regions 801 and 802 in FIG. 9 overlap. Similarly, a point 1302 represents a condition that upper sides of the regions 804 and 805 in FIG. 9 overlap, the point 1303 represents a condition that lower sides of the regions 801 and 802 overlap, and a point 1304 represents a condition that lower sides of the regions 804 and 805 overlap.

According to the above, in S1005, the correction amount determination unit 403 obtains the points 1301 to 1304, where the inclination of F(d) changes, and the intercept 1305 of F(d) and sets a value of d, among these points, that minimizes F(d) as a candidate point of the correction amount. Here, the number of candidate points of the correction amount d may not always be settled to be one. With reference to FIG. 13 as an example, the number of candidate points of the correction amount d is two (points 1302 and 1303).

The above has been explained the process in S1005.

Next, the correction amount determination unit 403 selects a candidate point having the smallest absolute value of d from the candidate points of d determined in S1005 (S1006). As described above, when the optical axis of the camcorder (imaging optical system) and the optical axis of the display (display optical system) are misaligned, the initial position of the clip position is the position set so that the center of the clipping region in the image captured by the camcorder corresponds to the optical axis of the display. Thus, when an amount d to shift from the initial position is made larger, the misalignment between the center position of the clipping region and the optical axis of the display becomes larger and it becomes difficult to maintain the geometric consistency between the real world and the virtual world. Therefore, it is desired to select a candidate point having the smallest absolute value of d. In FIG. 13, since the point 1302 has the smallest F(d) and the smallest absolute value of d, the point 1302 is selected.

Next, the image clipping unit 404 receives, from the correction amount determination unit 403, a preferable clip position correction amount d determined in S1006 and corrects the right-eye clipping center point (S1007). In other words, a position which is shifted by an amount of the correction amount d from the initial clip position stored in the initial clip position storing unit 402 is set as the right-eye image clipping center point.

Next, similarly to S1007, the image clipping unit 404 receives, from the clipping correction amount determination unit 403, a preferable clip position correction amount d determined in S1006 and corrects the left-eye clipping center point (S1008). In other words, a position which is shifted by the amount of the correction amount d to the initial clip position of the left-eye image stored in the initial clip position storing unit 402 is set as the left-eye clipping center point.

It is noted that the order of the execution of the processes in S1007 and S1008 may be switched.

Next, the image clipping unit 404 clips respective captured images based on the clip position corrected in S1007 and S1008 (S1009).

Next, the image processing unit 405 performs image processing such as a color adjustment, noise reduction and the like as desired on the clipped image (S1010). The image processing in S1010 may be performed before the captured image clipping process (may be performed before S1009, in other words). In this case, the image processing is performed on the entire captured image.

Next, a combined image, in which an image on which the image combining unit 406 has performed image processing and a computer graphics (CG) are combined, is generated.

Next, the image output unit 407 outputs the combined image generated in the image combining unit 406 to the HMD 101, and the display unit of the HMD 101 displays the image (S1011).

The above description is a process by the image processing apparatus 102 according to the present embodiment.

As described above, according to the present embodiment, even when a position misalignment of the imaging optical system and the display optical system occurs, it becomes possible to d splay to the user an image which maintains its display angle of view as suppressing a misalignment of the geometric consistency between the virtual object and the real space.

Second Embodiment

According to the first embodiment, the initial position of the clipping region, which is set so as to correspond to the optical axis of the display, is corrected based on the out-of-area amount, which is an amount of a region of the clipped region outside the image capture region. According to a second embodiment, when a clip position that makes the out-of-area amount minimum is greater than a threshold value, the threshold value is determined as the clip position.

A configuration of a device according to the second embodiment is similar to the image processing apparatus 102 described in the first embodiment. Further, a process procedure according to the second embodiment is also similar to the first embodiment. A major difference between the first embodiment and the second embodiment is S1003 in the flowchart of FIG. 2.

According to the present embodiment, the correction amount determination unit 403 maintains a threshold value $d_{max}$ ($d_{max} \pm 0$) of an absolute value of a correction amount d in advance. The value of $d_{max}$ may be set by a user or set automatically by the system.

Further, according to the present embodiment, a most preferable correction amount determination (S1006) process in FIG. 10 will be described in detail.

In S1006 according to the first embodiment, the correction amount determination unit 403 selects a candidate point having a smallest absolute value of d from the candidate points of d determined in S1005 and the selected point is set as the most preferable clip position correction amount. On the other hand, according to the present embodiment, when the selected d is greater than $d_{max}$, the $d_{max}$ is set as a most preferable clip position correction amount. The processes other than this process are similar to those in the first embodiment.

As described above, according to the present embodiment, even when the optical axes of the imaging optical system and display optical system are considerably misaligned, it is possible to display to the user an image maintaining a display angle of view as surely maintaining a misalignment of the geometric consistency within an allowable range.

Third Embodiment

According to a third embodiment, a configuration of the image processing apparatus, hardware diagram, functional block diagram, process flow flowchart, and the like are almost same as those of the first embodiment. Therefore, in the following, only a difference from the first embodiment will be described.

Figure 14:
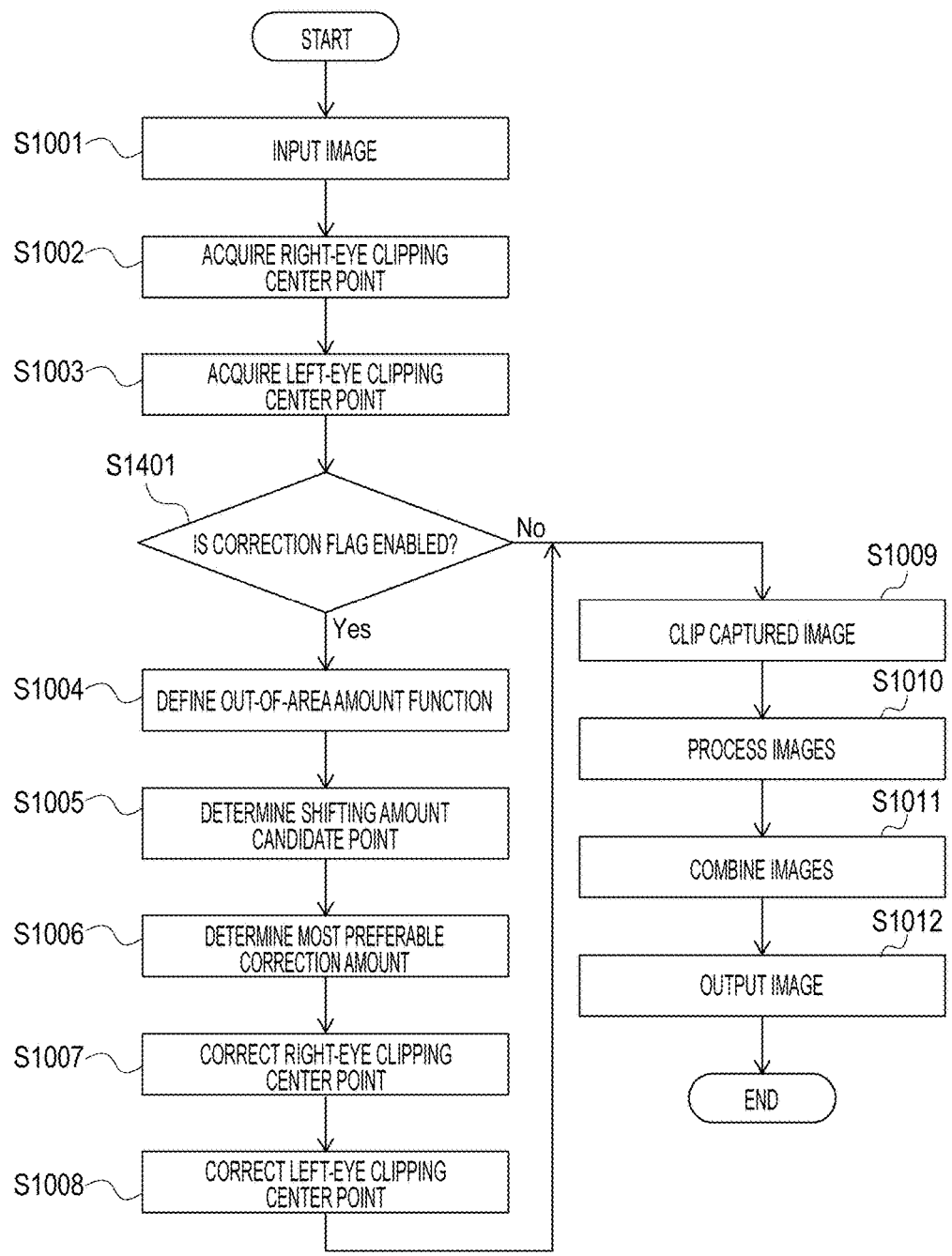
FIG. 14 is a flowchart illustrating a flow of a process by an image processing apparatus according to a third embodiment.

According to the present embodiment, a selection whether or not to perform a clip position correction process described in the first and second embodiments can be made. FIG. 14 is a flowchart illustrating an outline of a process flow according to the present embodiment.

The flowchart illustrated in FIG. 14 is approximately same as that of FIG. 10. Only the difference is that a conditional branch S1401 is inserted between S1003 and S1004. In S1401, the image combining unit 406 refers to a clip position correction process flag stored therein and, when the flag is enabled, the process proceeds to S1004. When the flag is not enabled, the process proceeds to S1009. When the flag is not enabled, the clip position not corrected as a result, and the image clipping unit 402 performs a clipping process so that the optical axes of the imaging optical system and display optical system correspond to each other.

Figure 15:
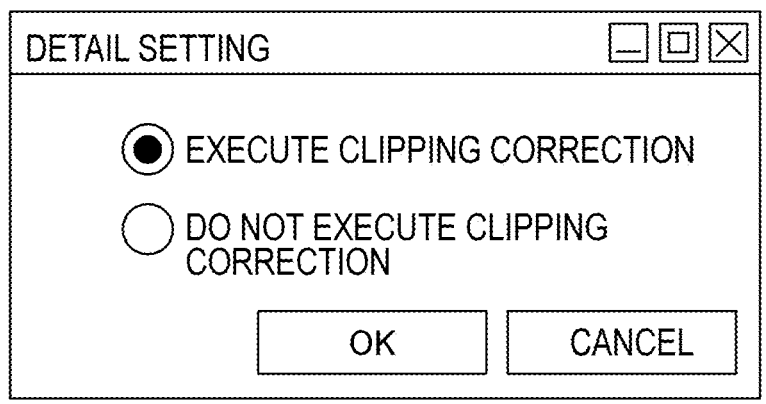
FIG. 15 is a diagram illustrating an example of a GUI of the image processing apparatus according to the third embodiment.

Here, the clip position correction process flag may be set with a GUI program illustrated in FIG. 15 for example. In a case of the present embodiment, when "Execute the clipping correction." of FIG. 15 is selected, the flag can be enabled. Further, when "Do not execute the clipping correction." is selected, the flag can be disenabled.

As described above, according to the present embodiment, when a misalignment of the positions of the imaging optical system and display optical system occurs, a correction process that minimizes a reduction amount of the display angle of view in the vertical direction can be selected as giving the priority on the suppression of the misalignment of the geometric consistency of the virtual object and real space. With this configuration, the clip position can be determined respectively according to a use case desired to minimize the misalignment of optical axes and a use case desired to minimize the out-of-area amount.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one o more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Applications Nos. 2016-144513, filed Jul. 22, 2016, and 2017-010748, filed Jan. 24, 2017, which are hereby incorporated by reference herein in their entirety.

What is claimed is:

1. An image processing apparatus comprising:
    an image acquisition unit configured to acquire a first captured image captured from a first point of view and a second captured image captured from a second point of view which is different from the first point of view;
    an initial value acquisition unit configured to acquire initial values of respective clip positions to clip display images from the first captured image and the second captured image;
    a derivation unit configured to derive a first out-of-area amount that indicates an amount of a first exterior region of a first display image located outside a first region of the first captured image when the first display image is clipped from the first captured image based on the initial values and to derive a second out-of-area amount that indicates an amount of a second exterior region of a second display image located outside a second region of the second captured image when the second display image is clipped from the second captured image based on the initial values; and
    a determination unit configured to determine the respective clip positions to clip the display images from the first captured image and the second captured image based on the first and second out-of-area amounts.

2. The image processing apparatus according to claim 1, wherein the determination unit acquires a sum of the first out-of-area amount and the second out-of-area amount and determines the respective clip positions based on the sum.

3. The image processing apparatus according to claim 2, wherein the determination unit determines the respective clip positions so that the sum is minimized.

4. The image processing apparatus according to claim 2, wherein, when one of the clip positions to minimize the sum is greater than a threshold value, the determination unit determines the threshold value as that one of the clip positions.

5. The image processing apparatus according to claim 1, wherein the determination unit determines a correction amount to correct the initial values of the respective clip positions based on the first and second out-of-area amounts and determines an initial value corrected based on the correction amount as the clip position.

6. The image processing apparatus according to claim 1, further comprising:
a clipping unit configured to clip the display images, from the image captured from the first point of view and the image captured from the second point of view, based on the determined respective clip positions;
a generating unit configured to generate an image based on the display images clipped by the clipping unit and based on an image of a virtual object; and
an output unit configured to output the generated image to a display.

7. The image processing apparatus according to claim 1, wherein a first image capturing device that captures the first captured image and a second image capturing device that captures the second captured image are provided in a head-mounted display.

8. An image processing apparatus comprising:
an image acquisition unit configured to acquire a first captured image captured from a first view point and a second captured image captured from a second point of view which is different from the first point of view;
an initial value acquisition unit configured to acquire initial values of respective clip positions to clip display images from the first captured image and the second captured image; and
a determination unit configured to,
in a case that a first mode is set,
derive a first out-of-area amount that indicates an amount of a first exterior region of a first display image located outside a first region of the first captured image when the first display image is clipped from the first captured image based on the initial values, and derive a second out-of-area amount that indicates an amount of a second exterior region of a second display image located outside a second region of the second captured image when the second display image clipped from the second captured image based on the initial values and
determine respective clip positions to clip the display images from the first captured image and the second captured image based on the derived amounts and,
in a case that a second mode different from the first mode is set,
determine the initial values as the respective clip positions to clip the display images from the first captured image and the second captured image.

9. The image processing apparatus according to claim 8, further comprising a setting unit configured to set one of the first mode and the second mode.

10. The image processing apparatus according to claim 9, wherein the setting unit sets the first mode or the second mode based on an input by a user.

11. The image processing apparatus according to claim 8, further comprising a head-mounted display that includes a first image capturing device that captures the first captured image and includes a second image capturing device that captures the second captured image.

12. The image processing apparatus according to claim 8, further comprising:
a clipping unit configured to clip the display images, from the image captured from the first point of view and the image captured from the second point of view, based on the determined respective clip positions;
a generating unit configured to generate an image based on the images clipped by the clipping unit and an image of virtual object; and
an output unit configured to output the generated image to a display.

13. An image processing method comprising:
acquiring a first captured image captured from a first point of view and a second captured image captured from a second point of view which is different from the first point of view;
acquiring initial values of respective clip positions to clip display images from the first captured image and the second captured image;
deriving a first out-of-area amount that indicates an amount of a first exterior region of a first display image located outside a first region of the first captured image when the first display image is clipped from the first captured image based on the initial values, and deriving a second out-of-area amount that indicates an amount of a second exterior region of a second display image located outside a second region of the second captured image when the second display image is clipped from the second captured image based on the initial values; and
determining the respective clip positions to clip the display images from the first captured image and the second captured image based on the first and second out-of-area amounts.

14. An image processing method comprising:
acquiring a first captured image captured from a first point of view and a second captured image captured from a second point of view which is different from the first point of view.
acquiring initial values of respective clip positions to clip display images from the first captured image and the second captured image; and
in a case that a first mode is set,
deriving a first out-of-area amount that indicates an amount of a first exterior region of a first display image located outside a first region of the first captured image when the first display image is clipped from the first captured image based on the initial values, and deriving a second out-of-area amount that indicates an amount of a second exterior region of a second display image located outside a second region of the second captured image when the second display image is clipped from the second captured image based on the initial values, and
determining respective clip positions to clip the display images from the first captured image and the second captured image based on the first and second out-of-area amounts and,
in a case that a second mode which is different from the first mode is set,
determining the initial values as the respective clip positions to clip the display images from the first captured image and the second captured image.

15. A non-transitory computer-readable storage medium storing a program that when executed by a computer causes the computer to serve as:

an image acquisition unit configured to acquire a first captured image captured from a first point of view and a second captured image captured from a second point of view which is different from the first point of view;

an initial value acquisition unit configured to acquire initial values of respective clip positions to clip display images from the first captured image and the second captured image;

a derivation unit configured to derive a first out-of-area amount that indicates an amount of a first exterior region of a first display image located outside the first captured image when the first display image is clapped from the first captured image based on the initial values, and to derive a second out-of-area amount that indicates an amount of a second exterior region of a second display image located outside a second exterior region of the second captured image when the second display image is clipped from the second captured image based on the initial values; and a determination unit configured to determine the respective clip positions to clip the display images from the first captured image and the second captured image based on the first and second out-of-area amounts.

16. A non-transitory computer-readable storage medium storing a program that when executed by a computer causes the computer to serve as:

an image acquisition unit configured to acquire a first captured image captured from a first point of view and a second captured image captured from a second point of view which is different from the first point of view;

an acquisition unit configured to acquire initial values of respective clip positions to clip display images from the first captured image and the second captured image; and a determination unit configured to, in case that a first mode is set, derive a first out-of-area amount that indicates an amount of a first exterior region of a first display image located outside a first region of the first captured image when the first display image is clipped from the first captured image based on the initial values, and derive a second out-of-area amount that indicates an amount of a second exterior region of a second display image located outside a second region of the second captured image when the second display image clipped from the second captured image based on the initial values, and determine respective clip positions to clip the display images from the first captured image and the second captured image based on the derived amounts and, in a case that a second mode which is different from the first mode is set, determine the initial values as the respective clip positions to clip the display images from the first captured image and the second captured image.

* * * * *